Figure 1:
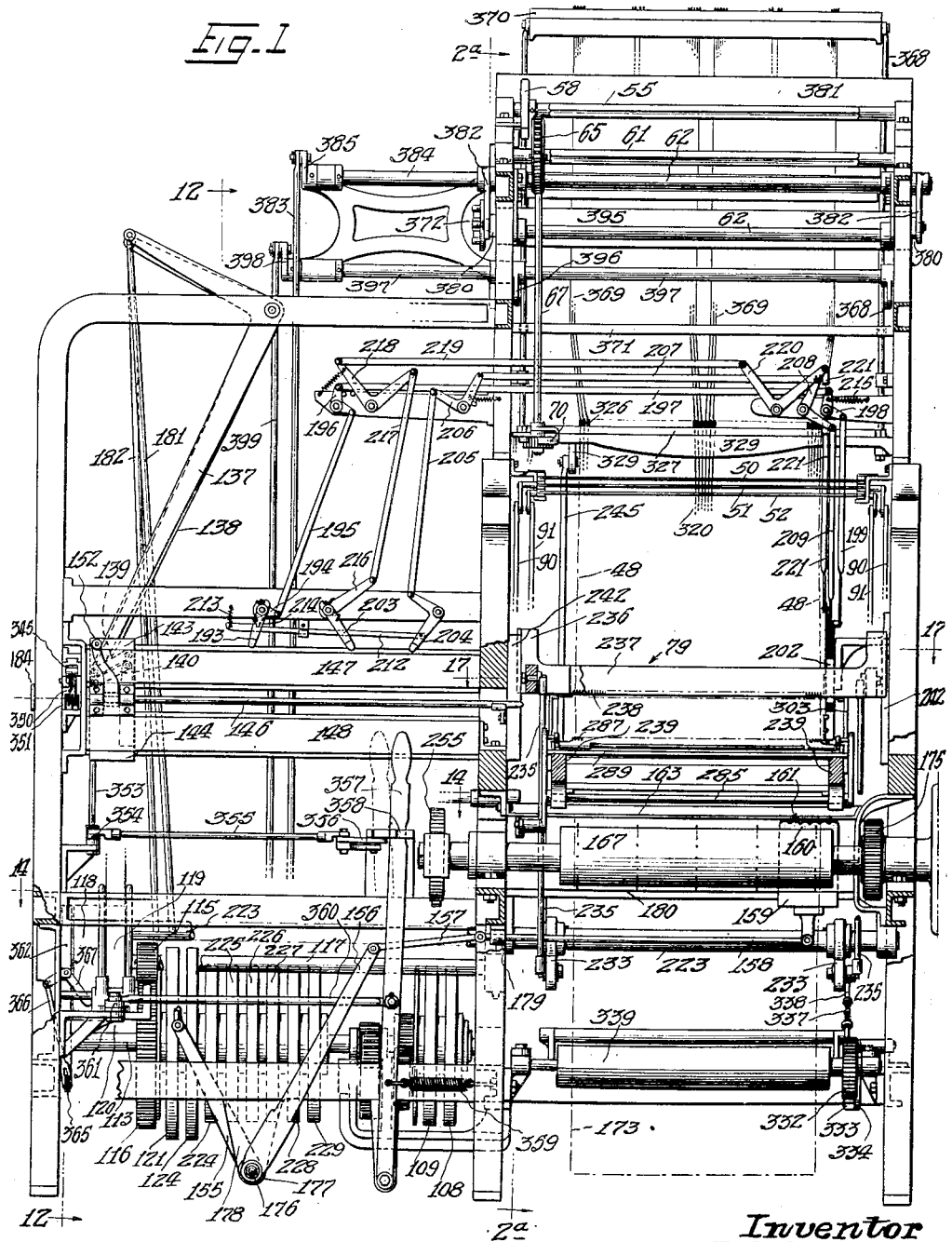

B. S. SMITH.
POWER LOOM FOR WEAVING DOUBLE PILE OR TUFTED CARPETS AND OTHER FABRICS.
APPLICATION FILED NOV. 7, 1919.

1,330,917. Patented Feb. 17, 1920.
8 SHEETS—SHEET 1.

Inventor
B. S. Smith,
By H. R. Kerslake
Attorney

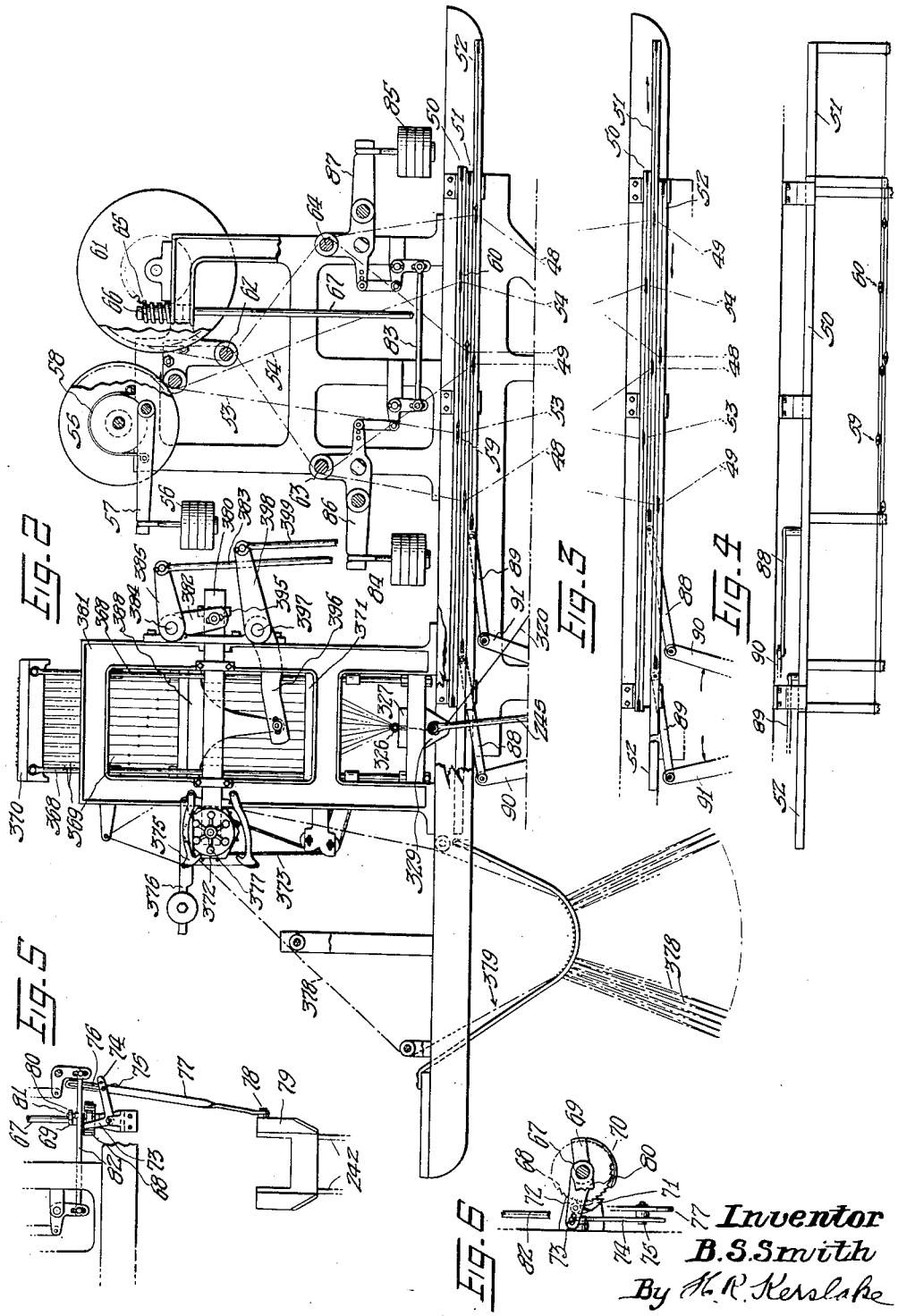

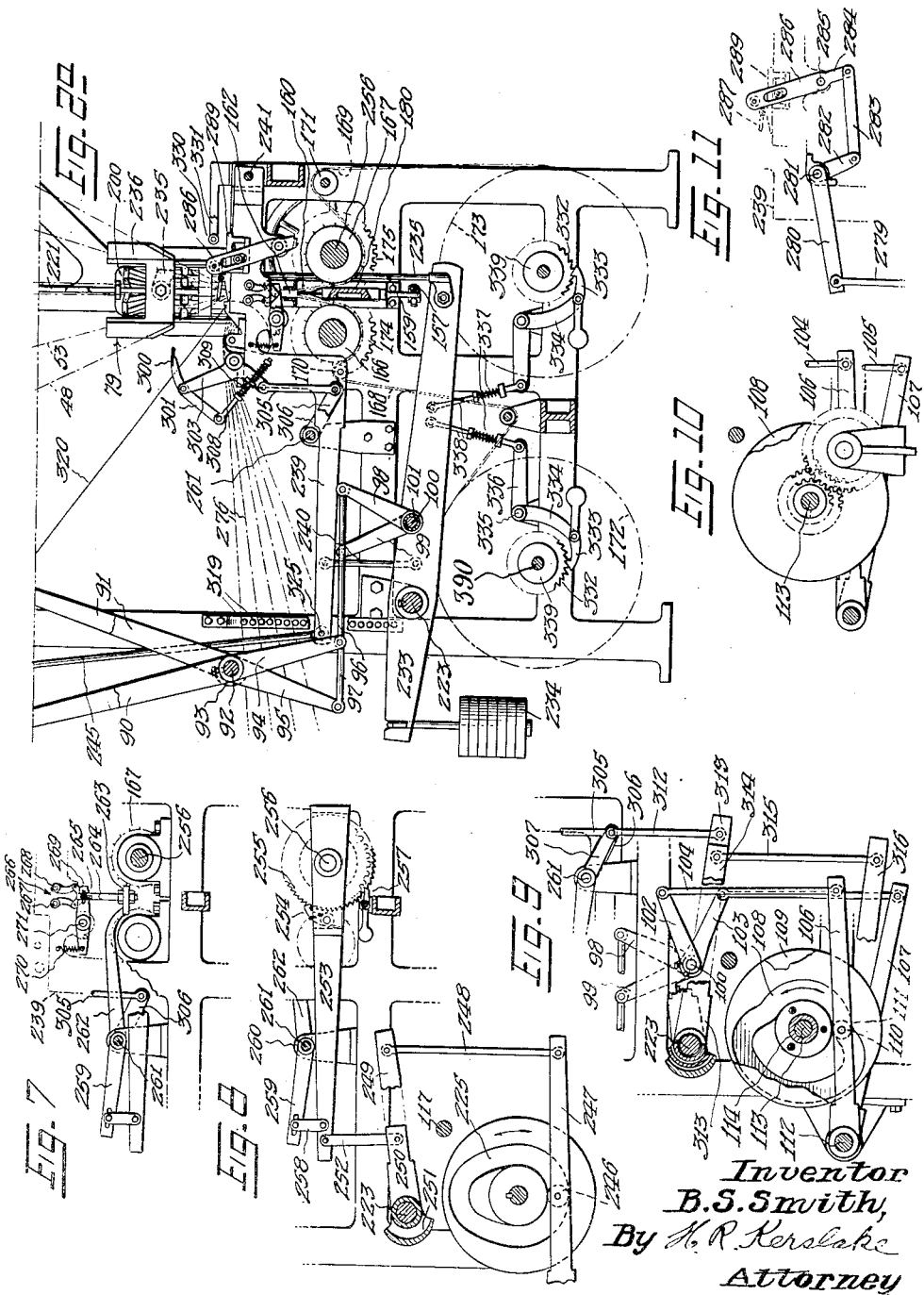

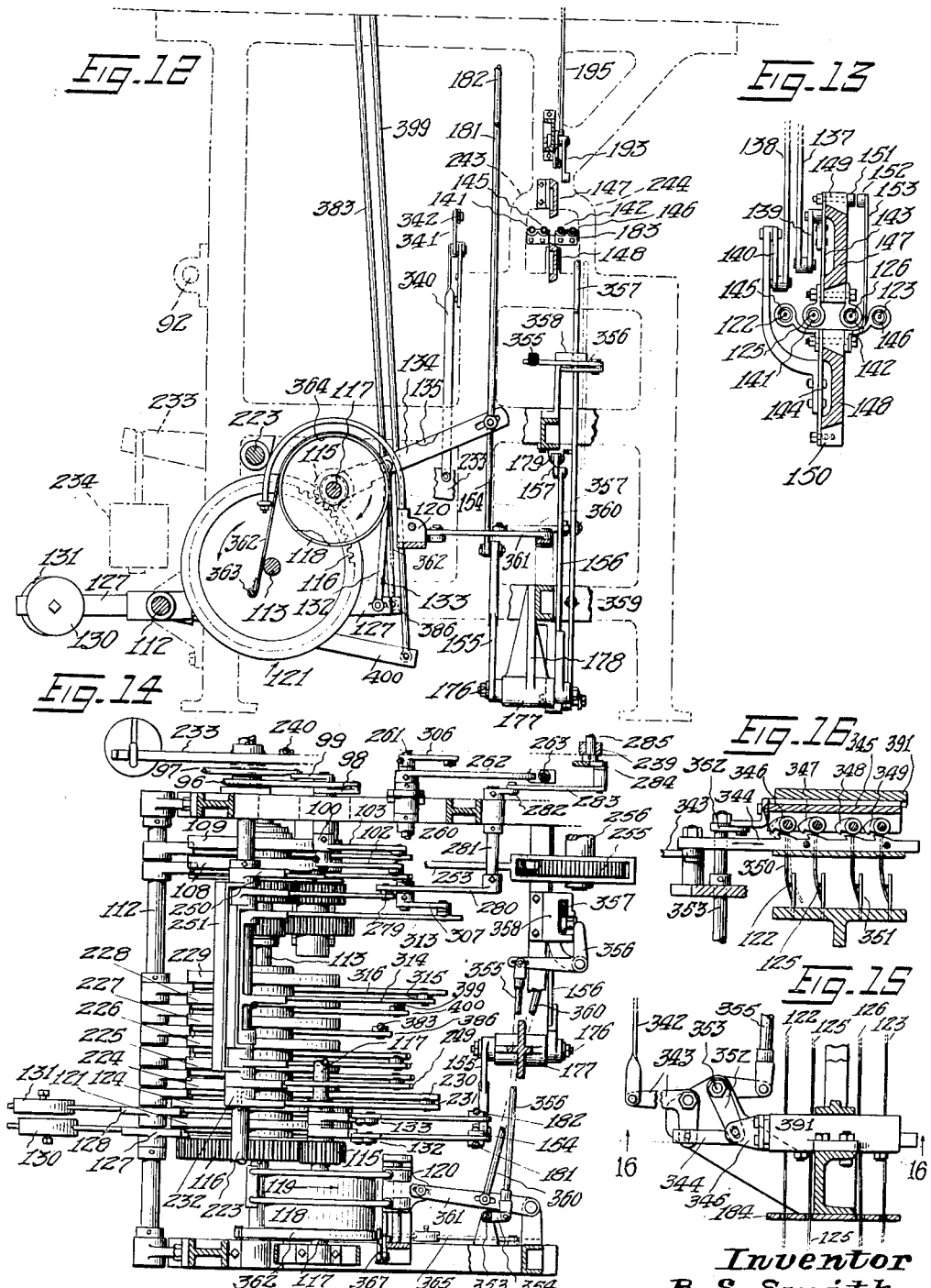

B. S. SMITH.
POWER LOOM FOR WEAVING DOUBLE PILE OR TUFTED CARPETS AND OTHER FABRICS.
APPLICATION FILED NOV. 7, 1919.
1,330,917.
Patented Feb. 17, 1920.
8 SHEETS—SHEET 5.
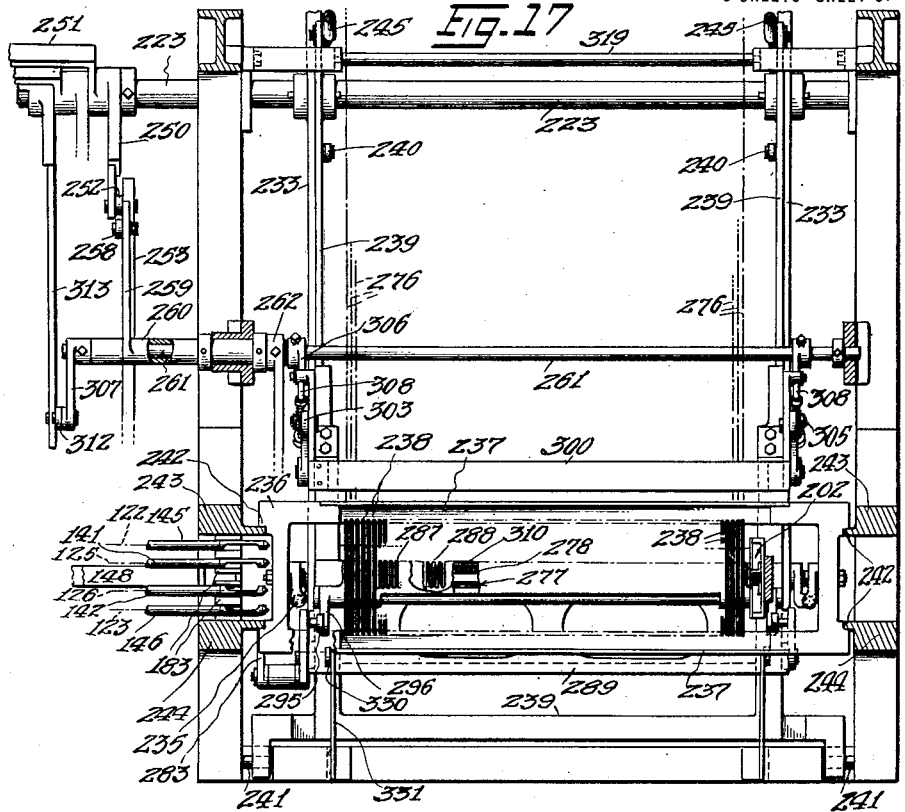
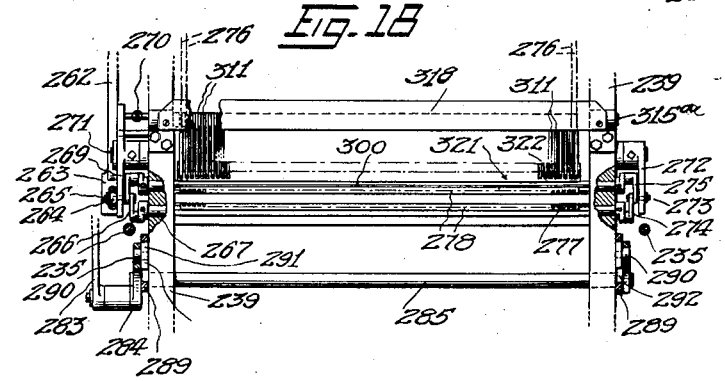
Inventor
B. S. Smith,
By H. R. Kerslake
Attorney

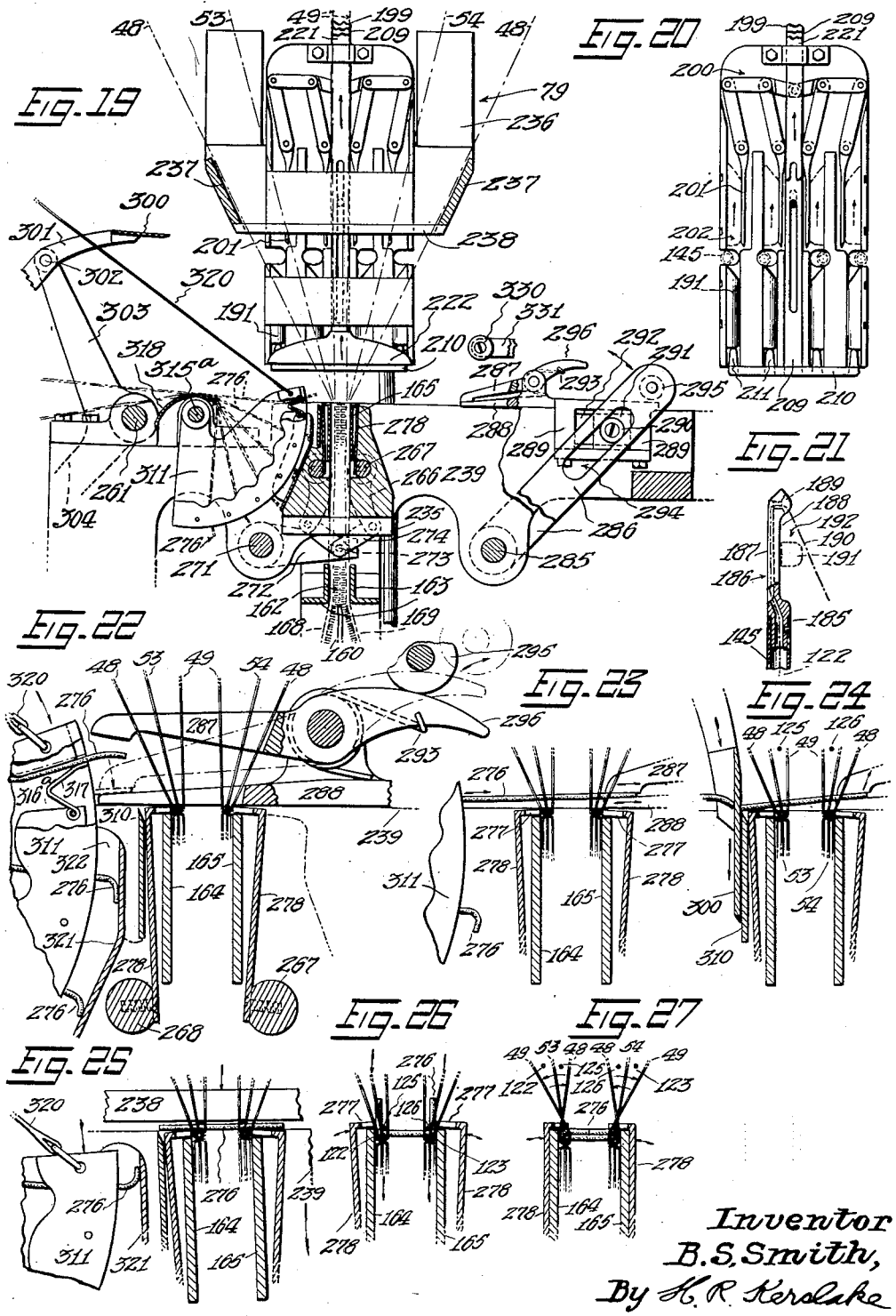

B. S. SMITH.
POWER LOOM FOR WEAVING DOUBLE PILE OR TUFTED CARPETS AND OTHER FABRICS.
APPLICATION FILED NOV. 7, 1919.
1,330,917.  Patented Feb. 17, 1920.
8 SHEETS—SHEET 7.
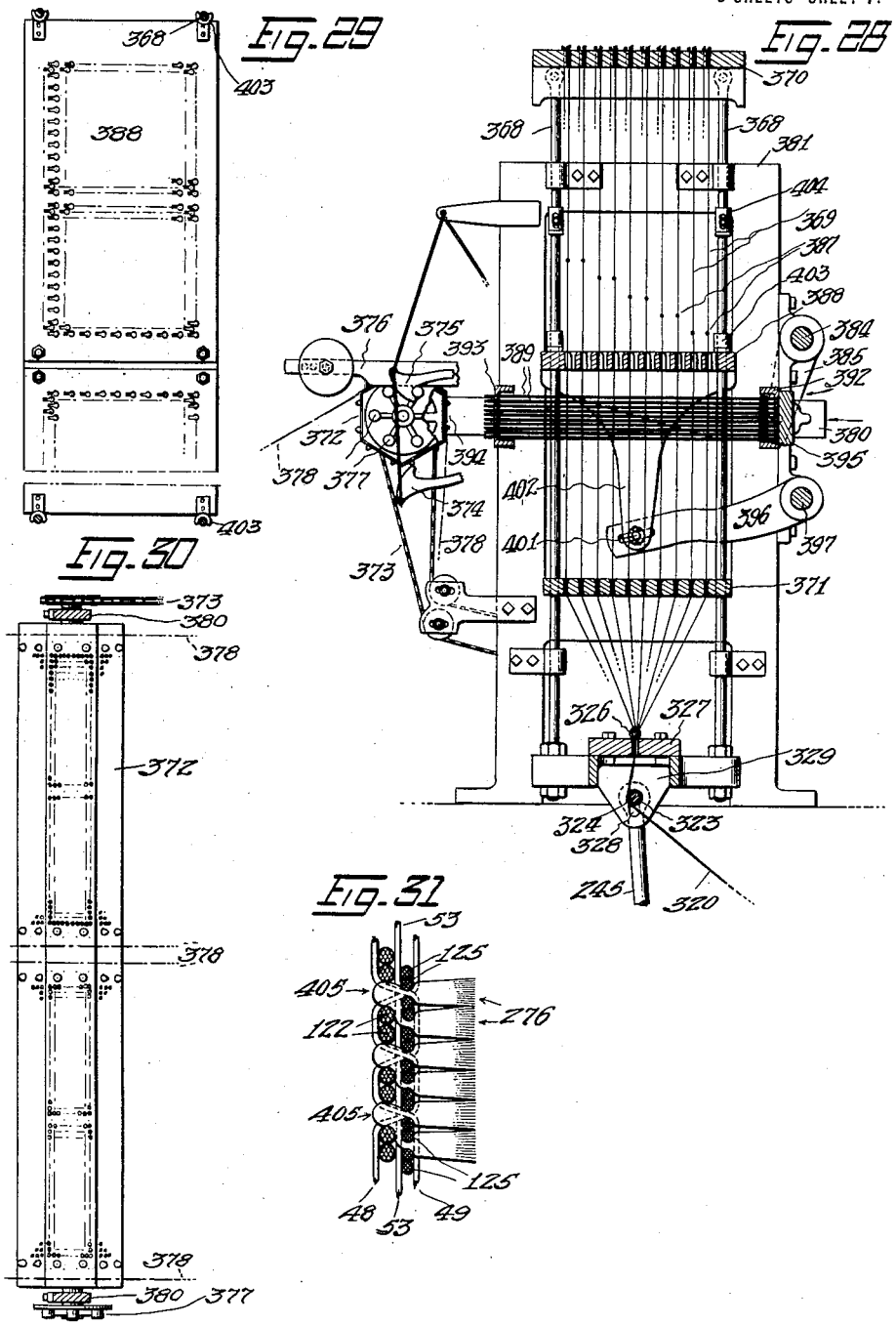

B. S. SMITH.
POWER LOOM FOR WEAVING DOUBLE PILE OR TUFTED CARPETS AND OTHER FABRICS.
APPLICATION FILED NOV. 7, 1919.
1,330,917. Patented Feb. 17, 1920.
8 SHEETS—SHEET 8.
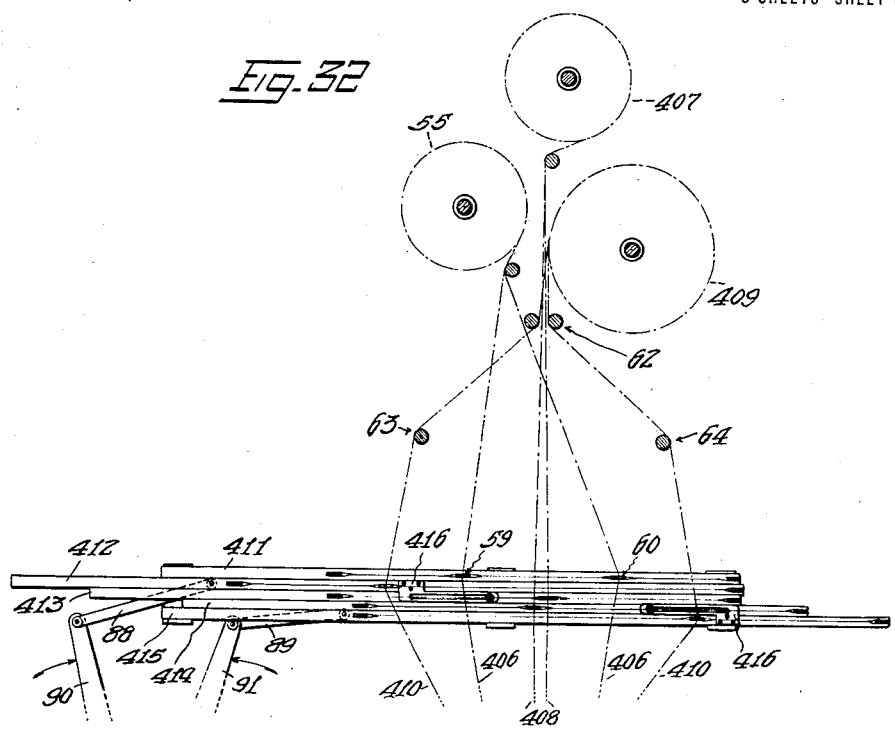
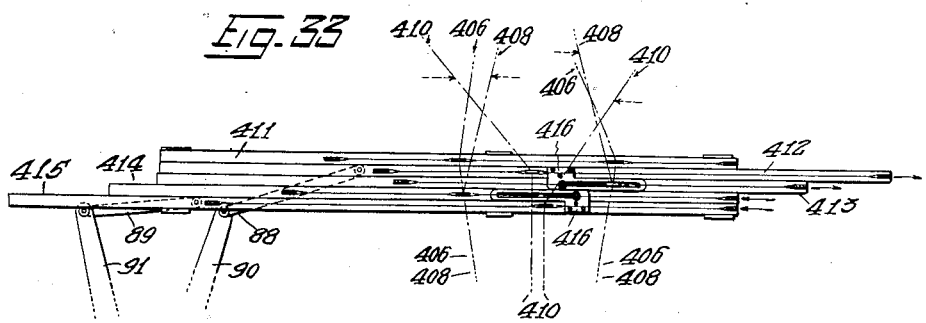
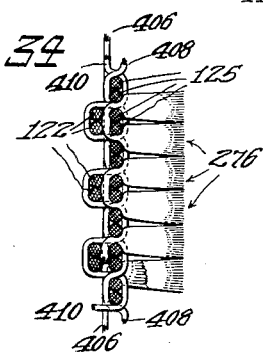
Inventor
B. S. Smith,
By H. R. Kerslake
Attorney

UNITED STATES PATENT OFFICE.

BENJAMIN SINCLAIR SMITH, OF MANLY, NEAR SYDNEY, NEW SOUTH WALES, AUSTRALIA.

POWER-LOOM FOR WEAVING DOUBLE PILE OR TUFTED CARPETS AND OTHER FABRICS.

1,330,917.  Specification of Letters Patent.  Patented Feb. 17, 1920.

Application filed November 7, 1919. Serial No. 336,375.

*To all whom it may concern:*

Be it known that I, BENJAMIN SINCLAIR SMITH, subject of the King of Great Britain and Ireland, residing at 9 Marshall street, Manly, near Sydney, New South Wales, Australia, have invented certain new and useful Improvements in Power-Looms for Weaving Double Pile or Tufted Carpets and other Fabrics, of which the following is a specification.

The primary object of this invention is to produce double pile "Axminster" carpets in a vertical type loom, splitting the double fabric after each movement of the lay. Two carpets are thus produced simultaneously. The loom in which the invention consists is also usable for the production of "plush" and other pile fabrics on the same principle.

In looms heretofore known wherein double pile carpets or plush fabrics have been manufactured and split during manufacture, a great waste of tuft wool was unavoidable as the wool threads were floated behind or between the warps and a limited part only of the tuft wool was utilized for forming the pattern. Pile goods, manufactured by the loom forming the subject matter of the present invention, are manufactured at a maximum economy because each pile tuft is looped around the weft threads, and buried only at the loop, where it is bound in the warp chains, so that there is a negligible quantity of the pile wool buried in the weave, substantially all of it being exposed in the pile and pattern, the ground work of the carpet or other pile fabric being constructed practically wholly of the warp and weft threads. It is already known in the art that single ply carpets or pile fabrics may be made with this economy of pile wool but it was not practicable heretofore to make split double pile goods so as to procure this advantage of economy.

The lay carries the reed and is retired to offer working clearance for the wool selectors, the folders, and the grippers during the crossing of the warps, the insertion of the wefts, and the cutting and folding of the pile tufts. The warps are disposed vertically below overhead warp beams, and the wefts are inserted in the sheds by needles. The reed is constructed as a grating which works in the dents between the warp chains and the selvage threads are inserted in the loops of the wefts by shuttles working in vertical races. Certain other features hereinafter particularly described, associated with the features already indicated, constitute a vertical type loom in which double woven split pile goods may be manufactured with maximum economy. These supplemental features notably include oscillating wool selectors which deliver the tuft wool threads to picker grippers which work through the dents in the warp chains, drawing the wool therethrough and laying it over the wefts, an oscillating top knife by which the tuft lengths are severed when so drawn and while still held by the grippers, and a double folder for the tufts.

In the accompanying drawings, which show a vertical type loom adapted for the manufacture of Axminster weave carpets:—

Figure 1 is a front elevation of the loom shown partly in section, certain elements in the background being omitted; Fig. 2 is a side elevation of the upper portion of the loom viewed from the left of Fig. 1, certain portions being shown in section; Fig. 2ᵃ (to read as a lower continuation of Fig. 2) is a side sectional elevation of the lower portion of the loom. This sectional elevation is taken on the line 2ᵃ—2ᵃ Fig. 1; Fig. 3 is a sectional elevation showing one fixed and two moving warp heddles, in spread position, opening the sheds to take the weft; and Fig. 4 is a partial plan corresponding with Fig. 3; Fig. 5 is a fragmentary view of the ratchet let-off mechanism for controlling the unwinding and tensioning of the back and face warps; and Fig. 6 is a corresponding top plan of same on an enlarged scale; Fig. 7 is a side elevation of portion of the tuft folder reciprocating mechanism; Fig. 8 is a side elevation of ratchet mechanism for operating the take off rolls after the fabric has been cut, showing also mechanism for operating the tuft folder levers; Fig. 9 is a side elevation, partly in section, of mechanism for operating the heddle frames and the tuft knife; Fig. 10 is an end elevational view of portion of the gearing controlling the timing of the heddles; Fig. 11 is an end elevational view of the link work for operating the tuft gripper; Fig. 12 is a side sectional elevation, taken on the line 12—12, Fig. 1, showing the belt shifting mechanism and link gear associated with the splitting knife; Fig. 13 is an enlarged elevation of the weft needle carriages and their rails, looking from the left of Fig. 1; Fig. 14 is a sectional plan of the actuating cam mechanism taken on the line 14—14 Fig. 1; Fig. 15 is an enlarged top plan of the connections for controlling the driving mechanism to stop the loom automatically upon the breaking of a weft thread; Fig. 16 is a corresponding sectional elevation taken on the line 16—16 Fig. 15; Fig. 17 is an enlarged sectional fragmentary top plan showing the lay beam, the reed, the weft needles, the tuft knife, and its actuating connections, and showing also the floating frame which carries the tuft inserting elements, taken on the line 17—17 Fig. 1; Fig. 18 is a sectional top plan of parts omitted from Fig. 17, showing the position of the wool selectors, the tuft folders, and their respective actuating links and lever arms and the pile gage cheeks; Fig. 19 is a side sectional elevation, showing the lay beam and the reed, the shuttle box, the floating frame, the tuft knife, and the wool gripper; Fig. 20 is a front elevation of the shuttle box, the shuttle guard plates being removed; Fig. 21 is a plan view, partly in section, of the head portion of a weft needle; Figs. 22 to 27 inclusive are illustrative of a sequence of operations, and serve to explain the delivery from a wool selector of the tuft wool, the operation of the gripper, the cutting of the tuft length, the laying up of the weft thread after the in-crossing of the warp binder chains, the infolding of the tuft ends, and the clearing motion whereby the folder jaws are closed over and retired free from the pile gage cheeks; Fig. 28 is a sectional side elevation on an enlarged scale showing the jacquard mechanism and jacquard harness; Fig. 29 is a plan of the comb board of the jacquard; Fig. 30 is a side elevation of the jacquard cylinder; Fig. 31 is an enlarged view taken sectionally through the back and face wefts of a finished Axminster weave fabric as produced in the machine arranged with three heddles, after splitting; (this view shows the interlocking of the warps and wefts and the binding of the wool tufts which form the pile;) Fig. 32 is a sectional side elevation showing four moving heddles, one fixed heddle, and three warp beams; Fig. 33 is an elevational view of the heddles of Fig. 32, shown in reversed position; Fig. 34 is an enlarged view taken sectionally through an Axminster weave carpet as produced in the machine arranged with five heddles, after splitting—(this view shows the interlocking of the warps and wefts and the bonding of the wool tufts which form the pile).

The following description, subject to what will be stated hereinafter definitely with reference to Figs. 32 and 33, is to be read as referring to my loom when operating with two warp beams and three heddles.

50 is the fixed heddle frame, 51 and 52 the oscillating heddle frames, 53 and 54 the stationary warps, both of which are drawn from stationary warp beam 55. The tension on this beam is set by a load weight 56 hanging on a brake lever 57 which pulls a brake band 58 bearing on the hub of the roll. The stationary warps 53 and 54 are carried through fixed eyes 59 and 60 of fixed heddle 50. The four crossing warps are drawn from the warp beam 61. They are carried over whip rolls 63 and 64, and over a guide roll 62. There are in all four of these warp threads, two going over the roll 63 and two over the roll 64. Thence these warps go to the eyes of the oscillating heddles 51 and 52 in alternate pairs arranged so that when the heddles are oscillated the four warps are crossed, two to the right and two to the left, thereby forming two parallel sheds in each of which a double weft thread is set to form the fabric of a double pile carpet.

Rotation of the warp beam 61 is controlled through a worm wheel 65 which is turned by worm 66 on the end of a vertical shaft 67, on the lower end of which a detent wheel 68 is fixed, as shown in Figs. 5 and 6. A swing arm 69 centered on shaft 67 carries a tripping sector 70 which is adapted to engage a spring pawl 71 carried on rocking arm 72, which is centered on shaft 67. The arm 72 is oscillated to and fro by work arm 73 and a bell crank. The power arm 74 of this crank carries an offset pin 75 which is free to run in a long slot 76 on link 77, the lower end of which is pivotally connected at 78 to lay 79. At each reciprocation of the lay the linkage and lever mechanism hereinbefore described causes reciprocating motion of pawl 71, so that said pawl engages the detent toothing on wheel 68 and applies step-by-step motion therethrough to the shaft 67, and so applies regular rotational feed motion to warp beam 61. The swing arm 69 is under control of lever arm 80 which may be integral with it, and said lever arm 80 is connected through pin 81 to a reciprocable link 82 which is a pair link to link 83 seen in Fig. 2, and moves with link 83. So long as link 82 is in the right hand position (see Fig. 5) the sector 70 is held clear of the pawl 71, so that the pawl operates normally to apply at each movement a step-by-step movement to shaft 67. When, however, the link 82 is moved over to the left, it functions to swing the arm 69 and thus bring the sector 70 under the angular toe of pawl 71 so as thereby to lift said pawl out and hold it clear from engagement with detent wheel 68. This control movement is automatic and is dependent upon the tension of the warp threads. Said threads passing over whip rolls 63 and 64 support the balance weights 84 and 85, the system of weights being link and lever connected as shown in Fig. 2 so that loss of tension in any of the warp threads resulting in a lessening of the inward pull on whip rolls 63 or 64 as the case may be, results in the dropping of the corresponding weight 84 or 85 and a consequent transverse movement of links 83—82, resulting in the engagement of sector 70 with the pawl, and the consequent arrest of the feed motion applied to warp beam 61. Any slackness in the warps is thus compensated. Complete compensation as between the two pairs of crossing warps is thus obtained by the compensating linkage described operating to arrest or liberate the action of the feeding device on warp beam 61, uniform tension being always maintained on the warps on beam 55 by means of weight loaded brake strap 58. In practice, the double ended balance levers 86 and 87 are cross connected in pairs, and there are four balance weights and not merely two as would appear from the drawing, Fig. 2.

Heddles 51 and 52 are respectively moved by harness links 88 and 89, which are pivotally connected to the heddles at one end and at the other ends are pivotally connected to the top ends of heddle levers 90 and 91. These heddle levers, as shown in Fig. 2ª, are respectively arranged in pairs, one pair being keyed to rocking shaft 92 and the other pair to tubular shaft 93 sleeved over rocking shaft 92. When the tail ends 94 and 95 of lever arms 90 and 91 move, the heddles 51 and 52 are reciprocated across the weaving bay of the loom to effect the crossing of the warps. Reciprocating motion is applied to lever arms 94—95 through links 96—97. Said links are pivotally connected to lever arms 98 and 99 respectively keyed to shaft 100 and sleeved shaft 101. These shafts in turn, as shown in Fig. 9, are rocked by lever arms 102—103 which are respectively connected by links 104—105 to rider levers 106—107 which are oscillated by face cams 108—109 respectively. The cam 109 is located behind cam 108 and is of the same shape but set 180° around so that levers 106—107 are moved oppositely. Levers 106—107 are fulcrumed on an arbor shaft 112.

Bottom shaft 113 carries the whole cam assembly for the machine, and cams 108—109 are mounted on a sleeve 114 which works on said shaft 113. Sleeve 114 is back geared through the spur wheels shown in Fig. 10 so as to reduce its speed to one-half the rotational rate of the shaft 113, as it is necessary that the left hand portion of shaft 113 which carries the assembly of cams having other functions, should turn at twice the rate at which heddle cams 108—109 turn. Once in each rotation of cams 108—109 a complete to and fro oscillation is applied to heddle frames 51 and 52 so that the warp threads are crossed to form the sheds.

When the five heddle arrangement is in use the back gear is disconnected and all the cams turn with shaft 113.

As best shown in Figs. 1, 12 and 14, cam shaft 113 is driven through reducing spur gears 115—116 from primary drive shaft 117 which carries fast pulley 118 and loose pulley 119. 120 is a belt shifter which is connected up to the control lever with automatic mechanism sensitive to the tension on the weft threads. Cam shaft 113 as well as driving the heddle cams carries an assembly of eight other cams performing various functions. Of these cams, the cam 121 applies movement to the face weft needles, that is the needles which carry the face wefts 125—126 (see Figs. 13, 15, 16, and 31) while the cam 124 controls the needles which carry back wefts 122—123 shown in the same figures. Cam 121 which controls the face weft is cut to apply two motions to the needles associated with it for every one movement applied to the similar needles controlled by back weft cam 124. Cams 121—124 are both face groove cams acting respectively on levers 127—128. Said levers, and other levers to be hereinafter mentioned which are operated by similar cams on shaft 113, are all fulcrumed on arbor shaft 112. 130 is a counterbalance weight on lever 127, and 131 is a similar weight on lever 128.

The outer ends of levers 127—128 are connected respectively by links 132—133 to intermediate levers 134—135. In Fig. 12, link 133 and the intermediate lever 135 stand immediately behind link 132 and lever 134, respectively. The point of connection of links 132—133 to intermediate levers 134—135 is at positions intermediate between the ends, and the fulcrums of those levers are located on shaft 117, so that the range of movement at the outer ends of levers 134—135 is proportionately increased, thereby obtaining a longer stroke than the stroke applied to levers 127—128 by cams 121—124. This augmented stroke is required for the purpose of obtaining the necessary range of movement of crank levers 137—138 to which it is transmitted through links 181—182, the long arms of which crank levers are connected by short links 139—140 to needle carriages 143—144. The former of these carriages 144 carries back weft needles 145—146. These carriages run respectively on rails 147—148, the rails and slide blocks 149—150 being dovetail fits and secured together by back plates which make up the structure of each carriage. The carriages are incapable of lateral movement on rails 147—148 but slide freely along them. The face weft carriage 143 makes two complete movements for every one complete movement performed by back weft carriage 144, this movement being applied by its cam 121 the groove in which is shaped to apply the double motion in each rotation to lever 127, while the groove in cam 124 is cut to apply a single motion only to lever 128 in each rotation. This double movement is required as there are twice as many face wefts as back wefts in the weave. The face weft carriage 143 is provided with a striker roller 151 on its upper part, and back weft carriage 144 is similarly provided with a striker roller 152 which is carried on bracket 153. Both striker rollers 151—152 are located close to each other but so as not to contact during the crossing movement of the carriages. Their function is to engage the levers which control the shuttle movements and the selvage lay movement, each needle movement calling for a shuttle movement to form the selvage.

From the outer end of the intermediate lever 134, as best shown in Figs. 1 and 12, a link 154 is connected up to a power arm 155 of a bell crank lever having its work arm 156 connected by link 157 to a pull and push rod 158 which is attached to the slider 159 on which is mounted the pile splitting knife 160. This knife is a long blade or assembly of blades formed with a sharpened invected edge 161, and, as shown in Figs. 2ª and 19, is located immediately below slot 162 between the cheek angles 163 which are located immediately below pile gage cheeks 164—165. The function of this knife is to split the woven double carpet as it comes down through the slot 162 and permit the two single pile carpets thus produced to pass on to the take off spike rollers 166—167. Fig. 2ª shows the split carpets 168 and 169 passing from spike rollers 166—167 over idlers 170—171, and thence to take off beams 172—173. The spike rollers are geared together through spur wheels 174—175, and drive is applied to roller 167 by mechanism hereinafter described. Take off beams 172—173 are fitted with step-by-step winding mechanism which is actuated by other mechanism also subsequently described. Lever arms 155—156 are respectively fixed on the ends of a rock spindle 176 which is carried in a bearing 177, said bearing being supported in a bracket 178 on the under side of the loom frame. Rod 158 which actuates the slider 159 is guided in a bearing 179 to assure it rectilinear movement, notwithstanding the throw of link 157. The slider 159 works on a dove-tail shaped rail 180, as will be seen in section in Fig. 2ª.

The pile splitting knife movements are obtained from the face weft cam 121. Said knife makes two complete reciprocations at each movement, thereby insuring by double cut the severing of the tufts of the pile and eliminating risk of tearing out tufts which might be missed if the knife were to make only one reciprocation at each movement.

The needles consist of long tubes (146—145 being the back weft needles, and 141—142, positioned between the back weft needles, the face weft needles). Each of these tubular needles is armed with an eyed head, the detail construction of which is best seen in Fig. 21, the tubular portions operating only as stems. The needles are guided in cradle races 183 which support their overhung weight and insure parallelism of their motion. In action, the needles pass across the weaving bay through the warp sheds and coact with the shuttles at the far side of said bay, carrying the weft threads across the sheds, engaging them with the shuttle threads, and bringing them back. At the near side of the weave the weft threads are bound by the warps. The weft threads are carried through the tubular stems of the needles from an eye plate 184 positioned on the left hand frame of the loom immediately behind the carriages, as shown in Fig. 1, the threads coming from bobbins located in any convenient position laterally of the loom. The thread passes through the throat 185 of needle head 186, and through the back groove 187 behind needle jaw 188, and thence out through needle eye 189. When a needle is traversed through the shed, drawing the weft from the left hand side of the weave across the shed, the forward thread lies in an angular position as shown at 190 Fig. 21, leaving room between it and needle jaw 188 for the shuttle 191 to pass through loop 192 and to hold the bight of the weft thread during the retiring movement of the needle while the back throw of the weft is being payed out by the needle under tension.

In the forward movement of face weft needle carriage 143, as shown in Fig. 1, striker 151 thereon engages tappet 193 and through it turns crank arm 194, pulls link 195, turns bell crank 196, pulls link 197 and turns the spring retired bell crank 198 and suspension link 199, then operates toggle joint 200, shown in Fig. 20, and releases the four spring claws 201 which hold up the shuttles 191 in their respective upper compartments in shuttle box 202. The position of the needles in relation to the idle position of the shuttles is shown in Fig. 20. Continuing its forward movement, the needle carriage kicks up spring pawl 203 without performing any mechanical action, and passes on until it strikes bell crank 204 which is connected through link 205, spring retired bell crank 206, link 207, and bell crank 208, to suspension link 209, and thus raises said link 209 and so moves up finger bar 210, said bar carrying fingers 211 which act beneath the several shuttles 191 to lift them. The shuttles, as they appear when in the raised position, are shown dotted in the upper part of Fig. 20. After the eyes of the needles have entered the shuttle race, the rising movement of the shuttles commences, and it continues during the further movement of the needle head through the shuttle race, the long jaw of the needle offering clearance for the full length of the shuttle to move up and pass the needle to draw through the selvage thread before the needle eye passes back beyond the shuttle race. In order to enable the shuttles to enter the compartments in the upper part of needle box 202, spring holding claws 201 must be eased to offer clearance. This is effected, as shown on the left of Fig. 1, by means of link connection 212 which is hung up to the loom frame by a spring 213 at its rear end, so that said rear end is caused to bear upward against a finger 214 on bell crank 194 operating said bell crank through the trip independently of its tappet 193, and through the medium of the link and bell crank mechanism already described to bend toggle joint 200 and thereby ease back the spring claws. As soon as the carriage passes tappet 204 and releases it, spring 215 acting on bell crank 198, operates to straighten out toggle 200 and close the spring jaws on the shuttles, thereby holding them in the shuttle compartment into which they have been raised as already described. The threads carried by the shuttles are thus brought up through the loops in the weft threads at the needle eyes. When the needles have moved backward until strikers 151—152 engage pawl 203, they operate through said pawl to move lever 216 downward and thence by means of link 217, bell-crank 218, link 219, bell crank 220, and link 221 (the upper portion of said link being shown broken away in Fig. 1 for clearness of explanation) to operate selvage lay 222, shown in Fig. 19, dropping said lay and thus forcing down the bight of the weft into the bottom of the shed close up to the shuttle threads which form the selvage warps. This lay is a narrow presser foot which is located laterally of but close up to the warp threads and does not interfere with the crossing of the warp threads in whatever position it may be. Bell crank tappet 204 is moved only a short distance when engaged by the striker on the needle carriage, and immediately the needle carriage commences its retiring movement, bell crank 204 and parts connected thereto resume their normal rest position under tension of spring 215. The result of this is that the spring claws are operated momentarily only but in proper timing to admit entry of the shuttles into the upper shuttle box compartments and to grasp and hold the shuttles after they have entered said compartments. In the further retiring movement of the needle carriage, the strikers thereon engage spring pawl 203, and acting through the linkage and bell crank lever connections previously described cause the laying of the weft threads. Further rearward movement continuing, the needle carriage strikers kick back pawl 193 without causing any mechanical action. When the full back position of the needle carriage is reached, the fall of the weft thread has been drawn clear through the shed so that a double weft thread is thus laid in the shed. At this point the crossing of the warps occurs. In the next movement all four needles move to throw another pair of face weft threads and a pair of back weft threads in the sheds. The wefting movements are thus alternated, in one of them face weft threads only being thrown while in the other of them face weft and back weft threads are thrown.

Tappets 193, 203 and 204 are actuated by either of the strikers 151—152. As the upper carriage 143 which carries the face weft needles makes two movements and the lower carriage 144 makes only one movement with the upper carriage and remains idle during the second movement of the upper carriage, the tappets might be worked by the striker 151 alone, but when the needles are brought into action in another timing as hereinafter explained the tappets are actuated by one or other carriage, so as that whenever a needle is advanced to the shuttle box the shuttle and selvage lay actions already described are caused to occur.

223 is a rock shaft through which rocking motion is applied to the floating frame and vertical movement is applied to the lay. This shaft is utilized to carry the bifurcated hubs of three levers. The third cam 224 applies oscillation to rock shaft 223. The fourth cam 225 operates the tuft folders and the take off spike rollers. The fifth cam 226 operates the pile grippers. The sixth cam 227 operates the jacquard cylinder. The seventh cam 228 operates the comb board of the jacquard machine. The eighth cam 229 operates the top knife by which the pile tuft lengths are cut off. The ninth and tenth cams control the heddles.

The third cam is structurally identical with the fourth cam, which is shown in Fig. 8. It acts through an offset tappet roller working in its face groove to apply oscillatory movement to a main lever 230, shown in Fig. 14, and thence by link 231 to an arm 232 keyed to shaft 223. The end of shaft 223, which is extended into the weaving bay (it is shown broken off in Fig. 14) has keyed to it a counter balance lever 233, 234 being the counterbalance weight on the rear end of said lever. There are two of these levers, one on either side of the weaving bay (see Fig. 17). As shown in Fig. 2ª, the forward ends of these levers are connected by links 235 to lay frame 236. Said frame has two cheek plates 237, angularly disposed one on either side of the outermost lines of warps (see Fig. 19). The lay may be reciprocated vertically within the range of its operative motion without interfering with the warp threads. Cheek plates 237 carry the reeds 238—which form a grating through which the warps pass—one reed passing between each chain of warp threads so that when the lay is bumped immediately after the warps cross, the weft threads are hammered home to close up the weave. There is sufficient clearance between the reeds to allow of the crossing of the warp threads.

The lever 233 functions also to lift and drop the floating frame 239, through a pair of push links 240 pivotally connected at their ends to lever 233 and to frame end members 239. The floating frame is fulcrumed on the fore side of the loom frame on two pivots 241 so that its motion procured by the movement of links 240 is angular about the pivots 241. This frame carries the top knife which severs the tufts after same have been drawn across the shed, the wool selector 311, the pile gage cheeks, the folders, and the pile grippers. Its function is to lower the parts necessary to offer clearance for the reed and eliminate risk of the reed touching the gage cheeks or other parts which would be liable to cause it mechanical injury; and after laying, to raise said parts above the tops of the pile gage cheeks.

Floating frame 239 is thus moved downward with the lay. As shown in Fig. 17, the lay frame is guided vertically by guide rails 242 forming part of or attached to vertical members 243—244 of the loom frame; the shape of these members is seen in Fig. 12, but their functioning will be best understood by reference to Fig. 17. As best shown in Figs. 2 and 2ª, there is a link connection 245 from the rear end of the floating frame 239 to the neck board of the jacquard machine, which will be hereinafter described.

As shown in Figs. 8 and 14, the fourth cam 225, like the third cam 224, is a face groove cam having a roller 246 working in the face groove, said roller being carried on the side of a lever 247 which is connected at its outer end by link 248 to a long arm 249 forming one bifurcation of the lever which is connected to its distant bifurcation 250 by rib 251 which straddles the mechanism carried on shaft 223 between its arm members 249—250, said intermediate parts being connected with the fifth, sixth, seventh, and eighth cams. The short arm 250 of this bifurcated lever is connected by link 252 to lever 253 which carries pawl 254 acting on a detent wheel 255, said lever 253 being fulcrumed on spindle 256 on which detent wheel 255 is mounted. 257 is a check pawl which operates to prevent rearward rotation of detent wheel 255. Spindle 256 which is turned by detent wheel 255 carries take off spike roller 167, and through intermediate spur gearing 175—174 functions to apply motion also to the other spike roller 166. At each reciprocation of lever 253, the spike rollers are therefore caused to turn through a definite angle and so to draw off the two split carpets bodily, bringing down the weave in progress through the cheek plates and thus applying progressive motion to the fabric as produced in the machine. Lever 253 is also connected by link 258 to arm 259 which is integral with sleeve 260 floating on shaft 261. Another arm 262 on the other side of said sleeve, as best shown in Fig. 7, carries a claw 263 which is connected by a stud 264 to knuckle pin 265 of toggle gear 266, the two arms of which function as levers to rock the spindles 267—268 which respectively carry the tuft folders 278 (see Fig. 22). The knuckle pin 265 works in a slotted hole in one arm of rocking lever 269. The outer arm of said lever is hung up by spring 270 to a fixed point on the frame, and said lever is keyed to a cross spindle 271 extending across the weaving bay. The distant end of this spindle, as best shown in Fig. 19, is fitted with an arm 272 which is connected by a corresponding knuckle pin 273 to a pair of toggle arms 274—275 corresponding with the toggle gear 266, to equalize the movement applied to the folders and obviate springing which would be liable to occur if they were moved by a connection at one end only. As the toggle mechanism and the folders are carried on the floating frame, it is necessary to provide for lost motion between the stud 264 and the knuckle pin 265. This lost motion is provided by forming a slot in the top of stud 264 for knuckle pin 265 to work in. Spring 270 functions to bend the toggle and consequently to close the folders. The closing movement of the folders occurs only when stud 264 is raised so as to act against pin 265 and spread the toggle joint. The function of the folders is to close in the ends of the pile tuft over face wefts 125—126. In Fig. 25, reed 238 is shown brought down on the face weft over the pile tuft 276, while the floating frame is lowered to provide clearance for that purpose. As the lay rises the floating frame moves upwardly about one-seventh of an inch, that is sufficiently to bring the lips 277 of folders 278 above the level of the front weft threads 125—126. Then the folders closing in, as will be seen on comparing Figs. 26 and 27, the ends of the pile tuft 276 which were forced into an erect position when the floating frame moved upwardly, are inturned so as to bring the edges over to abut, as seen in Fig. 27. As the folders come in to close down the ends of the tufts, the warps are crossed. This is also seen on comparing Figs. 26 and 27. It will be noted that underlying the tuft, a back weft and a face weft have been set, that a face weft is inserted in the fold of the tuft and bound in the crossing of the warps, and that a back and a face weft are inserted in the sheds formed in this crossing of the warps, so that when said new weft threads are closed down the weave is ready to receive another pile tuft, as shown in Fig. 23. In order to allow the folders to fold over the ends of the tuft, the carpet must be brought down between the gage cheeks a distance equal to the thickness of a tuft quite irrespectively of the floating movement of the frame, because there is no relative vertical movement between the folders and the cheek plates. This advance movement of the carpet, as before described, is effected by pawl 254 and detent wheel 255 which is proportioned to turn the spike rollers sufficiently to advance the carpet a distance equal to the thickness of one pile tuft at each reciprocation of lever 253.

Take up rollers 172—173 are turned to roll up the two sections of fabric as formed. Rotational motion is applied to these rollers by pawl and detent gear, which is identical on each of them. As shown in Fig. 2ª, 332 is a fine toothed detent wheel fixed to the axle of roller 172; 333 is a gravity drop pawl adapted to engage detent wheel 332; 334 is the drive arm of a bell crank lever fulcrumed at 335, and 336 is the power arm of said lever. Arm 336 is connected through a helical spring 337 with link 338 pivotally fixed to lever 233 which operates the lay and the floating frame. In each movement of lever 233 the bell crank lever 334—336 is rocked, causing pawl 333 to pick up the teeth of the detent 332 in order. Rotational movement is applied by pull of the spring 337; the downward movement of linkage motion 338 operates to engage the pawl while the pull motion occurs in upward movement of link 338. 339 is the barrel portion of the roller on which the fabric is wound.

The mechanism for automatically bringing the loom to a stop when any one of the weft threads breaks is shown particularly in Figs. 15 and 16. As best shown in Fig. 12, a link 340 from the lever 233, which operates the lay and the floating frame, is connected through linkage to a bell crank 341, a link 342, and a horizontal bell crank 343, to a detent rack 344 working in a slide guide 391. In a slider 345, four hook pawls 346, 347, 348, and 349 are mounted with their hooked ends engageable with the teeth of the rack 344. These pawls each carry a light sustaining finger 350. These light fingers respectively bear up against the four weft threads 122 and 125 which pass between them and the fixed studs 351 to the needles. Fingers 350 may slip past studs 351 as shown in Fig. 16 when the intervening thread 122 is absent. When any one of them slips past its stud (as shown in dotted lines) the corresponding pawl drops and engages the rack.

The rack is thus engaged with and operates to move slide 345 and lever arm 352 which is fixed on the top end of vertical spindle 353, and through it, as shown in Figs. 1, 14 and 15, to move lever arm 354 and thence by means of rod 355 and bell crank 356 to operate control lever 357, forcing it into the gate and allowing it to be pulled over to the off position by tension spring 359. While the belt striker 120 is located in relation to the fast pulley 119 and the loom is in operation, control lever 357 is held in the jaw of gate 358 as shown in the dotted position in Fig. 1. When the throw-off gear operates, it is pushed into the gate, as already described, by bell crank 356, and then pulled to the off position by spring 359, thus shifting the striking gear to the loose pulley. Control lever 357 is connected by bar 360 with throw arm 361 which controls belt striker 120. The starting and stopping of the loom manually is effected by manipulating lever 357. Provision is made for breaking the motion of the loom when the belt striker is moved to loose pulley position, by means of a friction band. This band 362, as shown in Figs. 1 and 12, is flexible and is fixed at one end 363 to the loom frame. It passes over brake drum 364, which is fixed to fast pulley 118. The other end of this band is carried on a weighted lever 365. Said lever is connected through linkage 366 to bell crank 367, which operates as a tappet in connection with belt striker 120, and functions to throw on the brake immediately the striker is moved to the loose pulley position, and to release the brake when the striker is moved to the fast pulley position. Very rapid stopping of the loom is therefore effected through the delicate control provided by the light fingers 350 while they are sustained by the weft threads 122. These threads cease to hold out fingers 350 at the time the normal tension of the threads slackens.

The fifth cam 226 applies reciprocating motion through a bifurcated lever and link mechanism similar to that shown in Fig. 9, to link 279, shown best in Fig. 11, which is connected to an arm 280 on spindle 281, the distant end of which carries another arm 282 connected by link 283 to lever arm 284 on spindle 285, said spindle carrying the slotted operating lever 286 which applies reciprocating motion to the pile gripper device.

As best shown in Figs. 17, 19 and 22, the pile gripper consists of a base plate 288, the forward part of which is slitted to provide clearance for the warp chains, so that one finger will pass between each chain (see Fig. 17). Pincer jaws 287 of the grippers are similarly slitted and are normally held closed by spring 293. Base plate 288 is formed with two lateral extensions 289 in each of which a rectangular guide race 292 is formed. In each of these guide races runs a slide block 291. Each of said blocks carries a bushed pin 290 which is embraced by the walls of a slot 294 in lever 286. The upper ends of levers 286 are armed with offset pins 295 roller bushed. These rollers co-act with the top side of the tappets 296 which form the back ends of the gripper pincers 287. Slide block 291 is shorter than the guide slot 292 in which it works, so that there is a certain measure of lost motion for a purpose hereinafter to be described. The function of the grippers is to cross between the warp chains, take hold of the ends of the tuft wool presented by the wool selectors, and bring the wool thread across the gage cheeks in the manner shown successively in Figs. 22 to 24. In the advancing movement toward the tuft wool selector, bushed pins 295 bear down on tappets 296 in the manner shown in Fig. 22 and open the pincer jaws a sufficient distance to insure admission thereinto of the ends of the pile tufts as seen at 276 Fig. 22. When the rearward motion of lever 286 commences, the grippers are not immediately withdrawn, but bushed pins 295 leave the tappets 296 and allow springs 293 to act to close the grippers on wool tufts 276 as shown in dotted lines Fig. 22. As the rearward motion of lever 286 progresses, slide block 291 attains the end of the guide slot 292 and then operates to move the grippers outward across the pile gage cheeks the required distance to draw out the required tuft length. The grippers are caused to open at this point by tappets 296 coming against striker rollers 330 carried on brackets 331 fixed to the frame, said rollers being positioned to meet the tappets and depress them. Thereafter the grippers continue to move outward to provide a clear path for the movement of the lay, leaving the pile tufts resting between the dents of the warp in the shed.

Oscillating top knife 300 is provided for cutting off the pile tufts when they are drawn from the selectors by the grippers and laid across the pile gage cheeks over the lips of the folders, which are formed as combs to insert between the warp chains. Knife blade 300, as best shown in Figs. 2ª and 19, is mounted on an oscillating arm frame 301 which is pivotally supported at 302 on arms 303 of a pair of bell crank levers, the power arms 304 of which are connected by links 305 to arms 306 on a cross shaft 261. The angular position of knife frame 301 on carrier arms 303 is set by means of spring cushioned tail rods 308 which run through holes in lugs 309 on arms 304 of said levers. The purpose of the spring cushioning is to enable the knife face to coact as a scissor blade with a counterpart knife blade 310, best shown in Figs. 22 and 24, which is a fixture behind the rearward folder 278, there being sufficient clearance for the folder movement between this fixed blade 310 and the rearward side of the rear pile gage cheek 164. When the pile tuft has been drawn across the weaving slot between the pile gage cheeks (see Fig. 24) and held there by the gripper jaws, knife 300 is caused to descend and cut off the tufts by scissor action. It is important to note that when this knife is idle it is retired clear behind the path of the lay 236 so that the lay may move without interference from the knife, and that when the knife is brought to the cutting position shown in Fig. 24, lay 236 is in the raised position shown in Fig. 19, so that the lay and the reed do not interfere with the knife action. It will be noted that the pile tufts are cut off at some distance in advance of the face of wool selector 311, so that tuft ends are left projecting from the selector ready to be picked up on the next movement of the grippers and drawn by the grippers as before between the warp chains.

Arm 306 is turned by shaft 261, and that shaft which carries the sleeve 260 beforementioned through which motion is transmitted to the folders, is fitted at its outer end with lever arm 307, as best shown in Figs. 9, 14 and 17. The end of arm 307 is connected by link 312 to lever 313 which forms one arm of a bifurcated lever which works on shaft 223 and receives motion at its other arm 314 through link 315 and lever arm 316 which carries on the side of it a bushed pin running in the grooved cam face on the eighth cam 229. This cam is also set for position so that the movements applied by it are timed, in order that the knife may be caused to descend to cut off the pile tufts immediately after they have been drawn across the pile gage cheeks to the position shown in Fig. 24.

The function of the tuft wool selector, which will be described in connection with the jacquard machine, is to bring the tufts of required colors to position in relation to the grippers, so that tufts of the required color will be presented to the respective grippers and by them be drawn through the warp chains as already described, thereby to produce the color pattern in the carpet. There is one wool selector for each dent in the warp chain. These selectors are narrow sector shaped boxes, each subdivided near the curved edge to form mouths for the passage of a wool tuft 276. They are hung side by side on an arbor spindle 315ᵃ, and are of sufficient weight, or are sufficiently weighted, to assure them dropping by gravity, so that they will always naturally assume their lowest position in which they offer the ground wool tuft 276 projecting from the uppermost mouth to the grippers, as shown in Figs. 19 and 22. Arbor spindle 315ᵃ is supported in the floating frame, and selectors 311 are raised by connections from the jacquard mechanism to bring one or other of selector mouths 316ᵃ into alinement with the grippers, thereby to offer therefrom a wool tuft of the required color determined by the jacquard action. In each mouth 316ᵃ a biting spring 317 of light wire is fitted to bear against the wool yarn 276 therein and impose a little tension on it and prevent accidental drawing back of the wool. The wool yarn is carried into the selectors over a curved rail 318 from separator guides 319 on the rear frame of the loom, each line of wool coming from a bobbin mounted in some convenient location close behind the loom. The tuft wool feed thus depends entirely on the grippers, the selectors holding the ends of the selected threads passively available to the grippers. As best shown in Figs. 1, 2, 28, 29 and 30, the movement of the several selectors by the jacquard machine is effected for each one of them by a separate line 320; the jacquard mechanism operates to move the several selectors to bring the selected wool tufts about half an inch above the level of the lower jaw of the gripper (see Fig. 22) and then immediately to lower the selector so as to lay the projecting end of the selected wool thread on the gripper jaw so that it may be readily secured by the pincer jaw of the grippers. This overlift and drop motion is necessary in order to insure that the gripping of the wool tufts will take place; this would not be certain unless the ends were positively laid in the gripper jaws, as they may be curled or kinked by contact with the apron 321, said apron being provided to keep the wool ends from contact with the elements in front of the selectors (see Fig. 19). Fins 322 on the apron 321 serve as spacers between the wool selectors to hold them in proper register in relation to the gripper jaws and the dents in the warp chains (see Fig. 18). Each wool selector is controlled by a lift cord 320. As best shown in Fig. 28, all of said lift cords are brought around the roller 323 on a bar 324. This bar connects the two links 245 which are pivotally connected at 325 to the rear end of the floating frame 239. Cords 320 are each fastened to a ring 326 which forms a stopper above a hole in the neck-board 327 of the jacquard machine (see Fig. 28). Rod 324 is carried at its ends in a slotted bearing hole 328 in lugs 329 which carry the neckboard 327 to allow a certain measure of lost motion. This lost motion device 328 is provided because the lift of the jacquard machine frame 368 at the end of the comb board movement must not be transmitted to the link 245 which, through the rod 324, connects the neck board with the floating frame 239 of the loom.

The jacquard is arranged to carry a group of pairs of tail cords 369, the upper ends of which are knotted above holes in the top board 370, and below are carried through holes in a guide board 371 and gathered below same, one from each pair to the respective rings 326, and thence by the lines 320 to the wool selectors. Each wool selector is thus connected up to a neck ring 326 carrying one pair of cords 369. The other cord 369 of each pair is connected to another ring corresponding with ring 326, which, like it, is located above another hole in the neck board 327, and is connected by cord 320 to another of the wool selectors. By grouping the jacquard tail cords in pairs and connecting one cord of each pair to a neck ring, the cross length of the jacquard machine is halved. The number of pairs of jacquard tail cords in each gang of tail cords is one less than the number of mouths in the wool selectors. In the drawing, five pairs of tail cords are shown in a jacquard arranged for operating with a 6-color wool selector. In these selectors (see 311 Fig. 19) the ground color wool is brought through the uppermost mouth as shown at Fig. 22. The wool selectors are moved by the jacquard from their normal ground color position shown in Fig. 22 to any other position to present the tuft of the required pattern color to the gripper. When the jacquard does not operate through one of the five pairs of cords on any particular selector to raise it to a pattern color position, the wool selector rests at the ground color position (Fig. 22) so that a ground color tuft is then offered to the gripper without requiring the jacquard to function to move the selector. As the bulk of the tufts usually consists of ground color, the work thrown on the jacquard is thus very substantially diminished, and an advantage of considerable importance is also attained in that it is not necessary to perforate the jacquard cards for the ground color. A minimum amount of perforation is therefore required on the cards and the wear on the cards is consequently diminished, and mechanical action in the selectors is minimized.

As best shown in Figs. 2 and 28, 372 is the jacquard cylinder, 373 the cylinder drive chain for rotating said cylinder by manual control, 374 and 375 are trip pawls by which the jacquard cylinder is rotated step-by-step at each transverse movement of jacquard slide 380. One of these hooks operates for effecting forward rotation and the other for reverse rotation of the cylinder. 376 is a weighted registering lever which bears on knuckles 377 on the side of the jacquard cylinder to insure the proper angular position of the cylinder at each partial rotation, so that the card in use will face squarely to the needle ends. 378 are the jacquard cards carried by lines in the usual way on a continuous track 379 over the jacquard cylinder. There is nothing novel in this arrangement, same being well known in the art. The jacquard cylinder is carried on transverse slide frame 380 supported in slide bearings on jacquard housing 381. This slide frame receives reciprocation motion through a pair of lever arms 382 on a cross spindle 384 having keyed upon it a rock arm 385 connected by link 383 to lever 386 which is operated by a tappet roller thereon working in a cam groove on the face of the sixth cam 227. As in the other cases, the cam position on the bottom shaft is set to operate the jacquard machine in proper timing. Tail cords 369 are knotted or have stoppers 387 attached to them, the position of such knots or stoppers being arranged in relation to comb board 388 to cause the engagement of the comb board with certain of said tail cords according to the operation of the jacquard needles 389 by the contact therewith of the jacquard card on the cylinder 372 to apply more or less lift to the respective neck rings 326, and therefore to the wool selectors respectively connected therewith. Thus, for instance, the knots or stoppers on the extreme right hand jacquard cords (Fig. 28) are engageable by comb board 388 immediately after said comb board has commenced its rising movement. Neck ring 326 is therefore lifted for the maximum throw of the jacquard, thereby to bring the connected wool selector to the position in which it will present the tuft of wool projecting from its lowermost mouth to the gripper. Similarly, in order, the pairs of tail cords carry their stoppers at different positions so that on the left of Fig. 28 the stoppers are engaged by the comb board only when that board has risen to near the top end of its throw, thereby applying a minimum rise to the connected wool carrier and so causing it to present the No. 1 pattern color to the gripper.

Needles 389 are as usual arranged in a gang, their rear ends being contained in a carrier box 392 fitted with means to prevent any of the needles from rotating in it. The forward ends of the needles are carried through holes in a guide plate 393 located directly opposite the presented face of card 394 in action for the time being, that is the card hanging on the inner face of jacquard cylinder 372. Needle carrier box 392 and needle guide 393 are fixed on jacquard housing 381, and the needles are slidable through the back of box 392 and through guide 393. Jacquard cylinder 372 is carried on slide frame 380 which is reciprocated transversely by lever arm 385. Slide 380 also carries a striker plate 395. In the left hand movement of the slide, striker plate 395 sets the needles to neutral position. In the right hand movement the card 394 on jacquard cylinder 372 is brought up to the needle points and operates to move inward those needles which contact with unperforated portions of the card, and thereby through the eyes on said needles to move tail cords 369 associated with the particular needles that have been so moved a litle out of the normal vertical line. The holes in the comb board (as will be seen on reference to Fig. 29) are key-hole shaped. When jacquard tail cords 369 are in normal vertical position in register with the wide portion of the comb board holes, the comb board passes stoppers 387 without lifting the cords, but conversely when any cord is in register with the slot portion of its comb board hole, its stopper 387 is engaged above the slot and the comb board operates to lift the tail cord. Comb board 388 is vertically reciprocated on jacquard frame 368 by means of arm 396 keyed to rock spindle 397, which extends across the frame and carries at its distant end an operating arm 398 which is connected by link 399, as shown in Fig. 12, to lever arm 400 which carries an offset roller pin working in a cam groove on the side of seventh cam 228. The connection between lever 396 and comb board 388 is through a slot and pin connection 401, 402 being foot brackets on the comb board which carry pins 401. 403 are half guides which hold the comb board 388 in vertical alinement. They run on frame 368, and at top stroke of the comb board they contact with adjustable tappets 404 fixed on frame 368, and when they so contact they apply a lifting movement to jacquard frame 368, being a movement of about half-an-inch. This movement transmitted through neck rings 326 and selector lines 320 has the effect of lifting the selectors about half-an-inch above the gripping position, with the object that the ends of the wool threads will be positively delivered into the gripper jaws. This selector setting movement occurs under all circumstances irrespectively of whether the comb board engages any of tail cord stoppers 387 or not. Each of the tail cords 369 is associated with a separate jacquard needle 389 in the usual way known in jacquard practice. The jacquard mechanism, however, includes the novel feature of the frame lifting motion which offsets the half inch extra lift applied to the wool selectors for the purpose of setting the ends of the presented tufts with certainty within the jaws of the grippers. The feature of wool selectors having an idle position in which the ground color wool is presented to the grippers without operation of the jacquard, thereby, as already described, effecting a saving in needle operation, and cost of preparing cards and wear and tear on cards is also a feature within the invention.

Depending on the number of heddles used, one arrangement being shown in Figs. 2 and 3, and the other in Figs. 32 and 33, the arrangement of the warp chains is altered. A section of the weave made according to Figs. 2 and 3 arrangement is shown in Fig. 31, while in Fig. 34 is shown a section of the weave which is made by the five heddle arrangement as in Figs. 32 and 33. In the case of the three heddle arrangement, a stationary warp 53 is set between the pairs of back weft threads 122 and face weft threads 125, the back and face warps forming a bonding chain, each loop of which includes two double face wefts and one double back weft, the fold of the tuft showing on the back of the fabric between the pairs of back weft threads. It will be noted that the back wefts are located midway of the two pairs of face wefts, with the fold of the tufts intervening between the pairs of back wefts and exposed on the back of the fabric. In the case of the five heddle weave, the back wefts are located in pairs immediately behind pairs of face wefts, while additional pairs of face wefts are located between said face wefts which are backed by the back wefts. A stationary warp 406 sets between the lines of face wefts and back wefts while the warps are alternated forming cross chains, each warp in turn coming over a pair of face wefts, then under a pair of back wefts, then behind a pair of face wefts, then up over a pair of back wefts, and so on, so that each pair of face wefts is bound in a chain while the back wefts are tied by a separate chain interlocked with the face weft chain, bonding the folds of the tufts between the pairs of back wefts and the pairs of face wefts, thus secreting the folds of the tufts from view at the back of the carpet and leaving spaces intervening on the back of the carpet between each pair of bonded back wefts. A corrugated appearance on the back of the carpet is thus obtained in the case of Fig. 34 weave which is effected with the five heddles, while in the case of Fig. 31 weave effected with three heddles the clearance which appears between the face and back wefts in Fig. 34 is occupied by the folds of the tufts, giving the back of the fabric a fuller appearance. In order to permit the operation of the five heddle arrangement and to provide for the difference in length of the face warps and the back-and-face warps respectively, these warps must be drawn off separate beams, inasmuch as the length of back-and-face-weft-bonding warp is considerably greater than the length of the face-weft-bonding warp. 407 is the beam which carries the face-weft-bonding warps 408, and 409 is the beam which carries the back-and-face-weft-bonding warps 410. The five heddles are respectively numbered 411, 412, 413, 414, and 415. The second (412) and the fifth (415) heddles are operated by linkages 88 and 89 corresponding with the linkages already described with reference to the heddle arrangement in Figs. 2 and 3; the additional heddles, being the third and fourth in the series, numbered respectively 413 and 414, are respectively moved by lost motion connections from second heddle 412 and fifth heddle 415. This lost motion arrangement consists of pin and slot plate devices 416 which permit a certain degree of movement of the driving heddles one way or the other before motion is applied from them to driven heddles 413 and 414. The lead and crossing of the warps to form the warp chains shown in Fig. 34 will be seen by following the course of the warps in sequence as shown in Figs. 32 and 33.

Beams 55 and 407 are fitted with friction bands identical with the band 58 shown in Fig. 2, and the warp threads drawn from them are maintained in tension by the action of these friction bands. Beam 409 is positively turned by worm gear identical with the worm gear 65—66 shown in Fig. 2.

Instead of using a system of wool selectors controlled by a jacquard machine as described, I may use the known method of presenting the wool tufts in order to form the pattern, which consists in using a chain of bobbins, each bobbin wound with wool threads in selected order for the pattern. In that case the jacquard is entirely dispensed with and the tufts are presented to be taken by the grippers from the several bobbins on the chain in successive order. This system is appropriate where the loom is required to produce considerable quantities of goods of the same pattern, and it is practicable with it to provide for an unlimited number of bobbins, thus offering unrestricted opportunity for forming a pattern irrespectively of the length between repeat points, or the number of colors required in the pattern.

What I claim as my invention and desire to secure by Letters Patent is:—

1. A power loom for weaving double pile fabrics, comprising overhead warp beams, from which the warps are drawn vertically downward, horizontal heddles through which the warps pass, a vertical motion lay carrying a reed through which the warps pass, horizontally movable needles for inserting weft threads in the warp sheds, shuttles operating in a vertical race for inserting selvage threads in weft loops formed by the weft threads, pile wool selectors and grippers for drawing pile wool from the selectors horizontally through the spaces between the warp threads.

2. In a power loom of the type defined in claim 1, a vertically reciprocating floating frame carrying a pair of horizontally disposed pile gage cheeks between which the woven fabric passes downward, and above which the weaving operations are performed, in combination with means for severing the pile tufts and means for infolding both ends thereof, said infolding means comprising two opposed toothed folder jaws movable horizontally across the top of said pile gage cheeks while said frame is in its upper position.

3. In a power loom, of the type set forth in claim 1, a fixed knife, a pile wool severing knife working in a curved path and coacting with the fixed knife to sever the pile wool while it is held by the grippers, and means for moving the wool severing knife upward and rearward after effecting the cut to offer a clear path for the operative movement of the vertical motion lay and reed.

4. In a power loom for manufacturing double pile goods, means for feeding a series of spaced warp threads, means for introducing tufts of pile wool into the weave, said means comprising a gang of wool selectors disposed laterally of the weft and each carrying a series of pile wool threads, a gang of pincer grippers, means for advancing said pincer grippers through the spaces between the warp threads, means for closing said grippers on the ends of wool tufts presented by the selectors, means for drawing said grippers back while closed thereby to draw the tuft threads across the warp threads, means including a reciprocating knife mounted to retire clear of the path of the lay for cutting off said pile tufts, and means for releasing the grippers after the pile wool has been cut by said cutting means.

5. A power loom for weaving double pile tufted fabric including a vertical motion lay carrying a grating reed, means for drawing warp threads vertically through said reed, means for crossing the warp threads within the reed to form a shed, means for placing weft threads in the shed, means for selecting, severing and placing pile tufts between the warp and weft threads, and means for raising the reed to elevate the same above the path of movement of the tufts selecting, severing and placing means.

6. In combination with the subject matter of claim 5, means for passing the weft threads through the warp sheds and bonding the bight of said threads in the selvage, said means comprising horizontal needles carrying the weft threads, vertical shuttles co-acting with said needles to introduce the selvage threads into the weft thread loops, and a selvage lay located laterally of the warps.

7. A loom of the kind defined by claim 5 in which selecting means carries ground colored pile tufts and colored pile tufts, said selecting means being movable and in its normal position presenting ground colored tufts to the tuft placing means.

8. In a power loom for weaving double pile tuft fabrics overhead beams from which warp threads pass vertically downward horizontal needles for inserting weft threads between the warp threads, pile wool tuft selecting means, grippers for drawing tufts through the spaces between the warp threads, means for unfolding the ends of the tuft threads, said selecting means consisting of pile wool selectors of sector shape each having a plurality of mouths in vertical order one below the other, each of said mouths being adapted to carry a wool thread of distinct color, jacquared controlled means for moving said selectors to bring the required wool tufts into register with said grippers, means for causing the grippers to pass through the spaces between the warp threads, means for causing the grippers to grasp the presented wool tufts from the selecting means, and means for causing the grippers to draw the grasped tufts through the spaces between the warp threads.

9. The combination with weaving mechanism of pile tuft placing means including grippers arranged at one side of the weaving bay and adapted to reciprocate through the spaces between the warps, means for reciprocating said grippers, means for opening and closing the grippers, wool tuft selectors located on the opposite side of the weaving bay and adapted to present colored pile tufts to the grippers, and means for controlling the selectors to cause the same to present the desired colored tufts to the grippers.

10. A combination as defined by claim 9, in which the selectors carry ground colored tufts which are presented to the grippers independently of the controlling means.

11. A combination as defined by claim 9, in which the controlling means includes a neck board provided with apertures, cords passing through the apertures and each having one of its ends connected to a selector, rings arranged above the neck board and connected to the other end of the cords, and means operating during the weaving for actuating all of the rings with the exception of those which are connected to selectors that are presenting ground colored tufts to the grippers.

12. A combination as defined in claim 9, in which each of the selectors consists of a pivotally mounted peripherally partitioned sector shaped box, the partitions dividing the box into a series of pile tuft passages, each adapted to contain a different colored tuft, the box normally resting in position to present ground colored tufts to the grippers, means controlled by jacquard mechanism for swinging the boxes on their pivots to bring the proper passages into alinement for presenting the desired colored tuft to the grippers, and tensioning means for the tufts located in each passage.

13. A combination as defined in claim 9 having means for lifting all of the selectors prior to the operation of the grippers to insure placing the pile tufts in proper position to be engaged by the grippers.

14. A combination as defined in claim 9 having pile gage cheeks located beneath the grippers, pile tuft folders located on the exterior of the cheeks and having lips which move toward each other to fold the pile tufts into the weaving, and means for actuating said folders.

15. A combination as defined in claim 9 having means for severing the pile tufts after they have been drawn through the spaces between the warp threads by said grippers.

16. A loom for weaving double pile fabrics comprising warp beams from which warp threads are drawn, heddles through which the warp threads extend, means for reciprocating said heddles, a reed and lay movable substantially longitudinally of said warp threads, means for drawing the warp threads through said heddles and reed, weft thread needles movable substantially at right angles to the direction of the warp threads for inserting weft threads in the warp sheds formed by reciprocating said heddles, means for reciprocating said needles, shuttles operating in a path extending substantially longitudinally of the warp threads for inserting selvage threads in loops formed by the weft threads at one end of the reciprocation of the needles, means for actuating said shuttles, pile wool selectors arranged adjacent said lay, and carrying pile wool adapted to be inserted between the warp and weft threads, grippers coacting with the pile wool selectors for drawing pile wool from the selectors through the spaces between the warp threads, means for controlling said selectors, and means for actuating said grippers.

In testimony whereof I affix my signature.

BENJAMIN SINCLAIR SMITH.